United States Patent
Barthel et al.

(10) Patent No.: US 7,890,557 B2
(45) Date of Patent: Feb. 15, 2011

(54) RELIABLE RECORDING OF INPUT VALUES

(75) Inventors: Herbert Barthel, Herzogenaurach (DE);
Bernard Mysliwiec, Erlangen (DE);
Andreas Schenk, Erlangen (DE);
Hartmut Schütz, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 981 days.

(21) Appl. No.: 10/578,426

(22) PCT Filed: Nov. 8, 2004

(86) PCT No.: PCT/EP2004/012623
§ 371 (c)(1),
(2), (4) Date: Apr. 9, 2007

(87) PCT Pub. No.: WO2005/048103
PCT Pub. Date: May 26, 2005

(65) Prior Publication Data
US 2007/0185945 A1    Aug. 9, 2007

(30) Foreign Application Priority Data
Nov. 13, 2003    (DE) .............................. 103 53 210

(51) Int. Cl.
*G06F 11/00* (2006.01)
(52) U.S. Cl. .................................... 708/136
(58) Field of Classification Search ........................ None
See application file for complete search history.

(56) References Cited

U.S. PATENT DOCUMENTS 5,608,661 A * 3/1997 Hoolehan et al. ............ 708/136
5,870,318 A * 2/1999 Hara et al. ................... 708/136
6,026,449 A * 2/2000 Takenaka et al. .............. 710/14
2009/0210719 A1* 8/2009 Yoshida ...................... 713/179

FOREIGN PATENT DOCUMENTS

| DE | 100 20 074 A1 | 11/2001 |
|---|---|---|
| EP | 0 182 134 A2 | 5/1986 |
| EP | 0 222 047 A1 | 5/1987 |

* cited by examiner

*Primary Examiner*—David H Malzahn

(57) ABSTRACT

The invention relates to a system and a method for the securely recording input values used for processing in a safety-oriented processor. In order to allow input values to be recorded securely by means of a non-safety-oriented operating device, a first value which is input via input means is displayed with the aid of an operating device using first display means, said first value is transmitted in an uncoded manner to a safety-oriented process along with an identification value, a second value transmitted by the processor is converted into a third value, said third value is displayed using second display means, a fourth value that is input via the input means is displayed using third display means, said fourth value is converted into a fifth value, said fifth value is transmitted in an uncoded fashion to the processor together with the identification value while the processor stores the first value, control values, and threshold values, compares the identification value to one of the control values by means of first comparing means, compares the first value to the threshold values with the aid of second comparing means, converts the first value into a second value, transmits the second value in an uncoded manner to the operating device, and compares the fifth value to the first value with the aid of third comparing means.

20 Claims, 3 Drawing Sheets

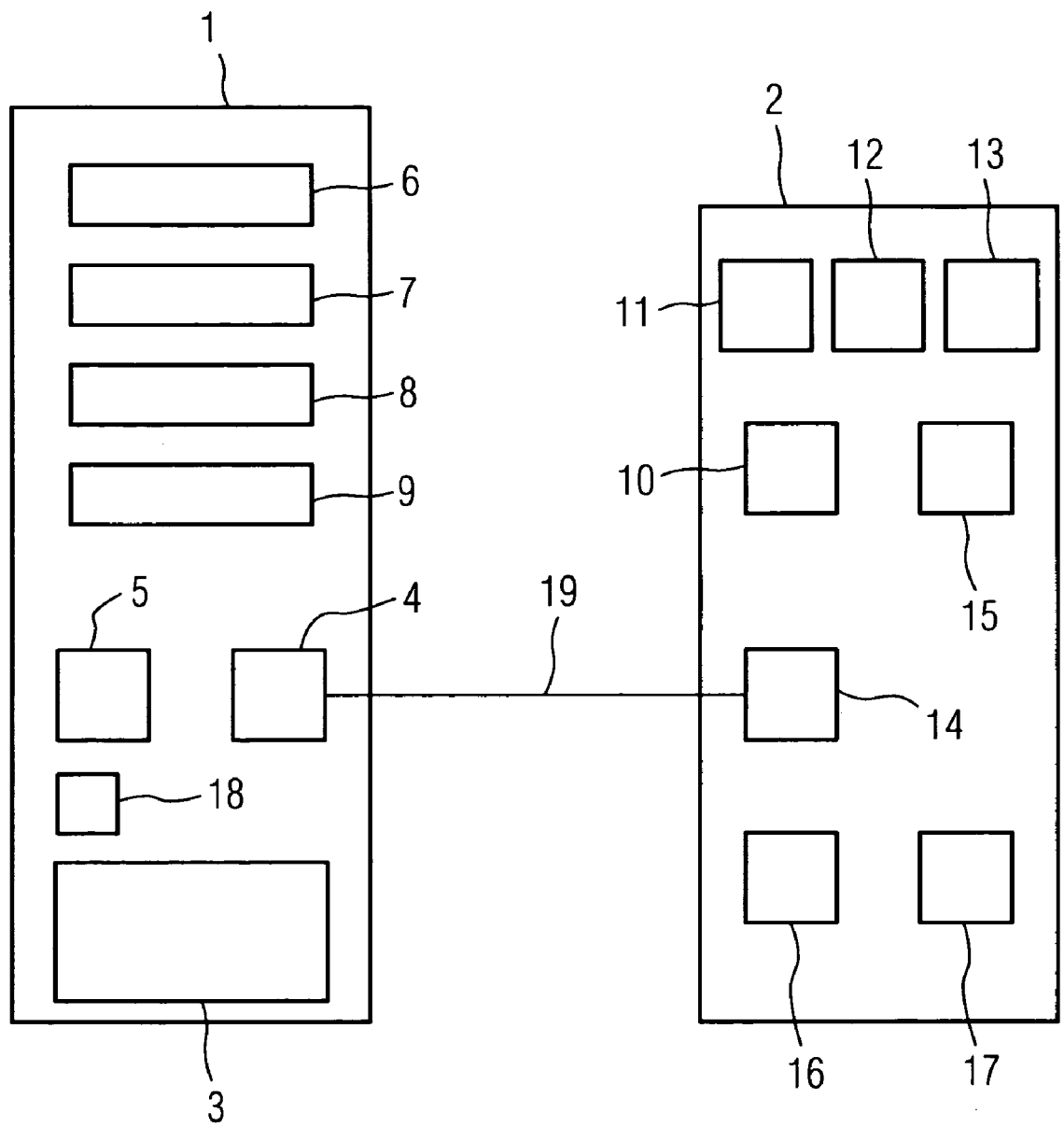

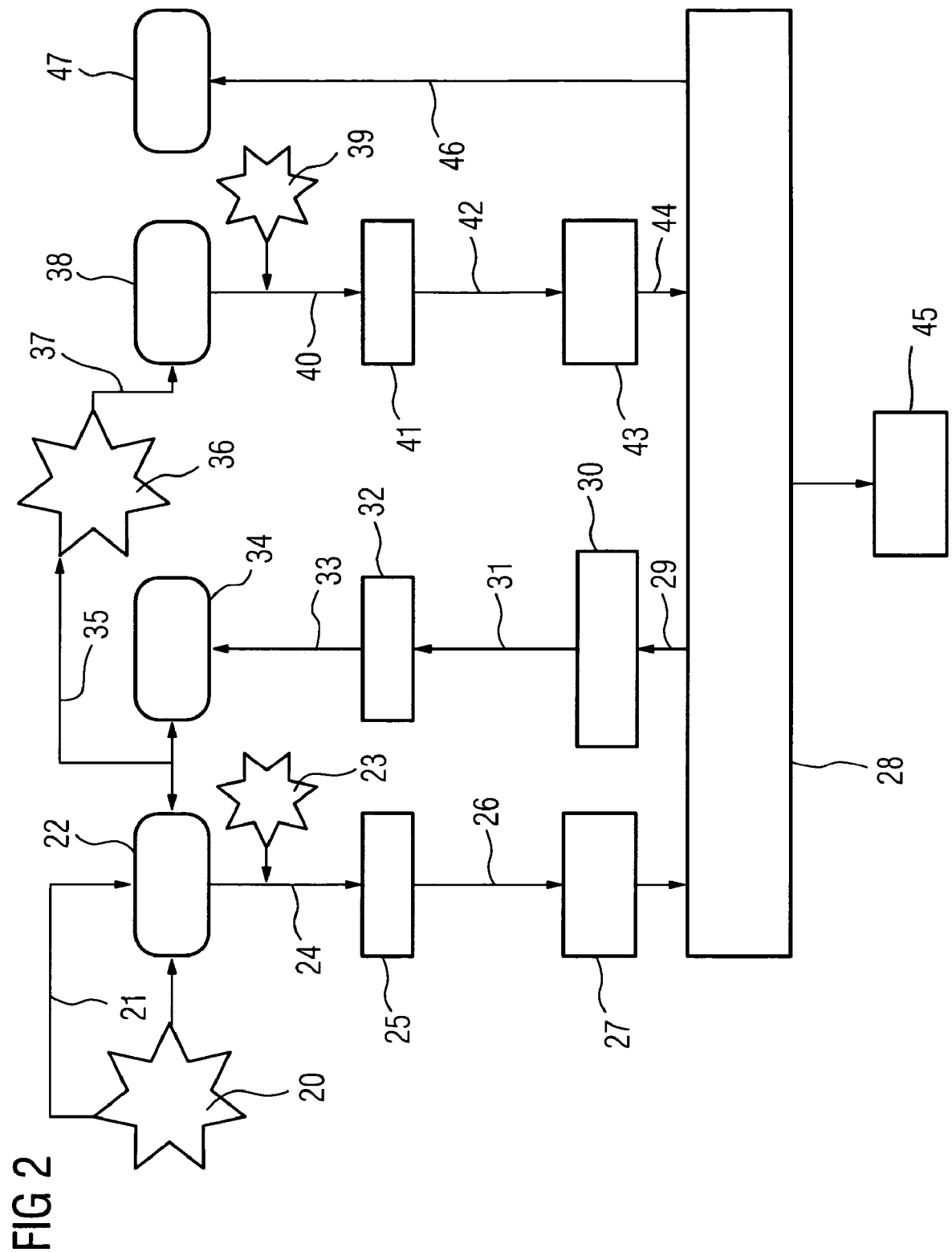

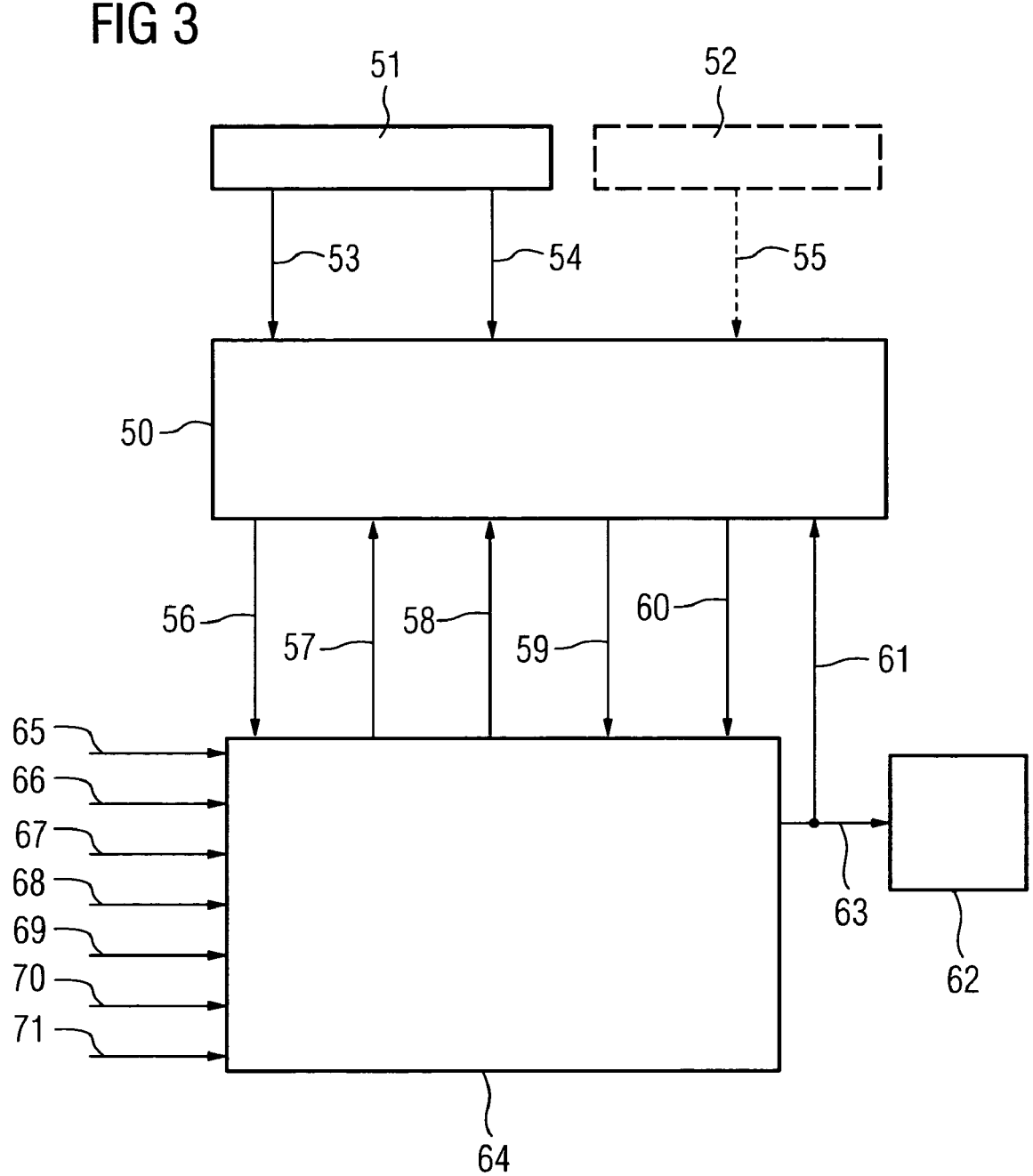

RELIABLE RECORDING OF INPUT VALUES

CROSS REFERENCE TO RELATED APPLICATIONS

This application claims priority to the German application No. 10353210.2, filed Nov. 13, 2003, and to the International Application No. PCT/EP2004/012623, filed Nov. 8, 2004 which are incorporated by reference herein in their entirety.

FIELD OF THE INVENTION

The invention relates to a system and a method for the reliable recording of input values for processing in a failsafe arithmetic unit.

BACKGROUND OF INVENTION

The facility to change parameters and values is just as much a desired feature in failsafe automation systems as it is in non-failsafe automation systems. According to DIN V VDE 0801 or VDI/VDE 3542, the term "failsafe" means that, in the event of a fault, a system is capable of remaining in safe mode or of immediately switching to another safe mode. Typical parameters in the case of failsafe automation systems are limit values (e.g. maximum pressure, maximum temperature) which, if exceeded, would put the system in a hazardous state. In the case of batch processes, for example, these limit values are unrelated to the batch to be produced and should be adaptable to the particular batch. At present there is no known reliable way for an operator to do this. According to the relevant standards (especially IEC 61508 and IEC 61511), changes affecting failsafe functions have to be checked and verified. This would make parameter change very complicated. From the safety engineering perspective, parameter change is subject to the requirements referred to below. If the parameter change affects a failsafe functionality of the automation system, a full function test has to be carried out in the case of such a parameter change, since potentially fatal states can occur if one of the parameters is wrong.

SUMMARY OF INVENTION

An object of the invention is to enable input values to be reliably recorded with a non-failsafe operator device.

This object is achieved by the claims.

The system for the reliable recording of input values has an operator device and a failsafe arithmetic unit, the operator device having first display means for displaying a first value which can be inputted via input means, communication means for the decrypted transmission of the first value, together with an identification value, to the failsafe arithmetic unit, arithmetic means for converting into a third value a second value which can be communicated by the arithmetic unit, second display means for displaying the third value, and third display means for displaying a fourth value which can be inputted via the input means, the arithmetic means being provided for the conversion of the fourth value into a fifth value and the communication means being provided for the decrypted transmission of the fifth value, together with the identification value, to the arithmetic unit, and the arithmetic unit having storage means for storing the first value and also for storing control values and limit values, first comparison means for the comparison of the identification value with one of the control values, second comparison means for the comparison of the first value with the limit values, arithmetic means for the conversion of the first value into a second value, transmission means for the decrypted transmission of the second value to the operator device, and third comparison means for the comparison of the fifth value with the first value.

This object is further achieved by virtue of a method according to the corresponding method claims, in which method, by means of an operator device, a first value inputted via input means is displayed with first display means, the first value, together with an identification value, is transmitted decrypted to a failsafe arithmetic unit, a second value communicated by the arithmetic unit is converted into a third value, the third value is displayed with second display means, a fourth value inputted via the input means is displayed with third display means, the fourth value is converted into a fifth value, and the fifth value, together with the identification value, is transmitted decrypted to the arithmetic unit, and in which method the arithmetic unit stores the first value and also control value s and limit values, compares the identification value with one of the control values by means of first comparison means, compares the first value with the limit values by means of second comparison means, converts the first value into a second value, transmits the second value decrypted to the operator device, and compares the fifth value with the first value by means of third comparison means.

The invention is based on the idea that, in order to reliably record input values without a failsafe operator device, change of the failsafe F functionality absolutely has to be avoided when recording takes place, since such a change would necessitate a full function test of the F functionality if the safety level is to be maintained.

If only one safety parameter is changed, however, the relevant standards and directives do not require a full function test since, unlike the change of a safety function (=F function), what is involved is a permissible transference or change of one safety parameter (see e.g. IEC 61511, Part 1, Chapter 11.7.1.5, Note 2). The advantage of this is that the operator device, and that includes both the device hardware and its software, does not have to be certified by an inspection authority (e.g. TÜV=Technischer Überwachungsverein [German Technical Inspectorate]). A further major advantage is that the F function or F program does not need to be stopped when parameters are changed; that is to say, input values can be recorded or changed while operations are ongoing. This makes it possible for values and F parameters (e.g. real value, integer or Boolean value) to be controlled or changed via a defmed certified interface in the failsafe arithmetic unit. The associated program in the operator device requires no certification and can run on any operator device. The program can be created by the owner.

The reliable checking of the identification value with one of the control values by the comparison means detects, in particular, address corruptions in the transmission of the values or of the identification value. From the perspective of relevant safety standards, e.g. IEC 61508, the interface(s) between the operator device and the arithmetic unit can be regarded as a pre-planned interface, the functionality of which has to be accordingly tested.

According to an advantageous development of the invention, the arithmetic means are provided for the generation of a complement of the values. Reflection of the value or complement enables transmission errors and data corruptions, especially common-mode data corruptions, to be detected.

According to a further advantageous development of the invention, the arithmetic unit has means for the release of the first value as a function of results of the comparisons of the comparison means. The purpose of the check of the verification of correctness, also referred to as acceptance, is to detect data corruptions, erroneous acceptance and simultaneous operation of a plurality of operator devices.

Advantageously, the first display means and the second display means are provided for the display of the first value and of the third value, respectively, in mutually different formatting. The standard value is thus calculated from the returned value or complement and is displayed in, for example, a different character font. A logical short in the operator device can thus be detected. Errors in the input conversion are detected, since the user compares the keyboard input with the input field. Errors in the output conversion are detected, since the user compares the input field and the "readback". A "short" from the input field to the readback field is especially easily detected by virtue of the fact that the readback is displayed in a different character font and by the comparison with the "value accepted". The user is advantageously given the option of canceling the input as a result of the fact that the operator device has an abort function which can be activated via the input means.

Programmable monitoring means for time-monitoring the communication of the first value and the fourth value in the arithmetic unit enables the non-permissible simultaneous operation of a plurality of operator devices to be detected.

To provide the user with information on the value finally accepted by the arithmetic unit as the safe value, the operator device advantageously has fourth display means for the display of a further sixth value that is transmissible by the arithmetic unit.

The safety of the system and method is further enhanced if storage means are provided for the diversitary storage of the control values and/or if the input means do not permit a drag & drop function. As a result, for each entry the user is forced to input the value all over again. The value is always required in the form of keyboard input.

The arithmetic unit advantageously has failsafe function means for safely carrying out a function test of the operator device. Systematic errors of the operator device, in particular, are detected by virtue of the safe generation of a test of the operator function in the operator device. A function test in the operator device can thus be carried out at startup and at every proof test interval. A "short" from the input field to the readback field can also be thereby detected.

In environments in which access to the system by unauthorized persons cannot be reliably prevented, the operator device advantageously has means for authenticating users.

BRIEF DESCRIPTION OF THE DRAWINGS

The invention is described and explained in more detail below with reference to the exemplary embodiments shown in the figures, in which:

FIG. 1 shows a system for the reliable recording of input values, said system having a non-failsafe operator device and a failsafe arithmetic unit;

FIG. 2 shows the sequence of a method for the reliable recording of input values; and FIG. 3 shows a further system for the reliable recording of input values, said system having an operator device and a failsafe arithmetic unit.

DETAILED DESCRIPTION OF INVENTION

FIG. 1 shows a system for the reliable recording of input values, said system having a non-failsafe operator device 1 and a failsafe arithmetic unit 2, e.g. a central processing unit (CPU) of an automation system. The operator device 1 has first display means 6, second display means 7, third display means 8 and fourth display means 9. The operator device 1 also has input means 3, e.g. a keyboard, and also means 18 for authenticating users, e.g. a lock or a (chip) card reader. The operator device 1 additionally incorporates arithmetic means 5 and also communication means 4. The communication means 4 are connected to communication means 14 of the arithmetic unit 2 via a communications link 19. The arithmetic unit 2 has first comparison means 11, second comparison means 12 and also third comparison means 13. The arithmetic unit 2 incorporates storage means 10 and also arithmetic means 15. The arithmetic unit 2 additionally has programmable monitoring means 16 and also failsafe function means 17.

The reliable recording of input values is explained in more detail below with reference to the exemplary embodiment shown in FIG. 1. A user of the system can, by means of the operator device 1, input via the input means 3 a first value, the input value, which is then displayed to him with the first display means 6. As a result of the immediate display of the inputted first value, the user receives feedback concerning the inputted first value and can correct the said value if necessary. The user terminates the input by operating a return key or a verification key that is provided for this purpose and forms part of the input means 3. The first value thus inputted, together with an identification value assigned thereto, is transmitted decrypted to the failsafe arithmetic unit 2. The identification value is also referred to below as identifier or val ID. The failsafe arithmetic unit 2 stores the received first value, the said unit comparing, first, by means of first comparison means 11, the co-transmitted identification value with a control value stored in the storage means 10 of the arithmetic unit 2 and comparing, second, by means of second comparison means 12, the first value with limit values stored in the storage means 10 of the arithmetic unit 2. In the next step, the arithmetic means 15 of the arithmetic unit 2 convert the first value into a second value. In the exemplary embodiment, this conversion is the generation of the complement (=complementary value) of the first value. The thus converted or transformed second value (in this case, therefore, the complement of the first value) is transmitted back (reflected), again decrypted, to the operator device 1 and is converted into a third value in the arithmetic unit 2 with arithmetic means 5. This conversion from the second value into the third value is an inverse operation to the first conversion from the second value into the third value (in this case, again the generation of the complement). The third value thus converted or transformed should therefore correspond numerically to the first value. The third value is displayed to the user with second display means. The user checks the displayed third value and, if appropriate, as verification of the conformity of the first value displayed to him with the third value displayed to him, inputs the same value again—for the second time—as the fourth value via the input means 3 of the operator device 1. The inputted fourth value is again immediately displayed to him with third display means 8, so that he receives immediate feedback and can, if appropriate, immediately correct his input. In the next step, the operator device 1 converts the fourth value into a fifth value with the arithmetic means 5—in this case again into the complementary value, and transmits the fifth value, together with the identification value, decrypted to the arithmetic unit 2. The arithmetic unit 2 then, by means of third comparison means 13, compares the fifth value to the first value stored in the storage means 10. The fifth value should be the complement of the first value. If all the comparisons carried out with the comparison means 11, 12, 13 have produced a successful result, in a last step the arithmetic unit 2 can process the thus reliably recorded first value as a safe input value.

FIG. 2 shows the sequence of a method for reliably recording input values. The method is used for reliably recording an input value as a safe value (known as the "F value") 45 by means of an F function 28 (F=failsafe) which runs, for example, in the arithmetic unit 2 as shown in FIG. 1. A user executes a key input 20 via input means, e.g. an operator terminal. The value inputted by the user is displayed in an input field 22. The user compares the value displayed in the input field 22 with the value inputted by him. The user comparison procedure is indicated in FIG. 2 by the reference character 21. If, in the user's opinion, the value has been correctly inputted, he presses an enter key 23. The inputted value is then written as a value 24 into a memory word 25. This memory word 25 is transmitted in a write request 26, together with an identifier, to an input interface 27 with the F function 28. The input interface 27 itself is not of a failsafe design. The F function 28 reflects the input value back as a complement 29 via what is called a "mirror interface" 30. The complement is read by the operator device as a memory word 32 by means of a read service 31 (polling). In the operator device, the memory word undergoes conversion 33 into its complementary value. The complementary value of the memory word 32 should be the value inputted in the first step. The complementary value is now displayed on a display field 34. In a further comparison 35, the user compares the two values displayed in the input field 22 and in the display field 34 and, if the two values correspond, inputs the value a second time with a key input 36 as verification. The value thus inputted is again displayed in a further input field 38 and is immediately checked by means of a further comparison 37 by the user. If the input value corresponds to the previously displayed values, the user can again operate an enter key 39 and thus initiate a conversion 40 of the inputted value into its complement. This complement is temporarily stored as a memory word 41 and is transmitted in a write request 42, together with the identifier, to what is called an "acceptance interface" 43 with the F function 28 in the form of what is called an "acceptance" 44. The F function 28 checks the acceptance 44 and, if it is correct, accepts the inputted value as the safe value 45. In the exemplary embodiment shown in FIG. 2, this value is also transmitted as a safe value 46 to the operator device and displayed to the user in a further display field 47. The user now also has the option of responding by carrying out another safety input or by stopping the function if the value displayed in the display field 47 does not conform to the required input value.

FIG. 3 shows a further system for the reliable recording of input values with an operator device and a failsafe arithmetic unit. The purpose of FIG. 3 is especially to clarify which parts of such a system execute failsafe functions and, to this extent, have to be of a reliable design or have to be accepted or certified by an inspection authority (e.g. TÜV). These parts of the system for executing failsafe functions are indicated in FIG. 3 by the reference characters 62-71. The other parts of the system (indicated by the reference characters 50-61) can be of a standard design, that is to say a non-failsafe design.

In the exemplary embodiment shown in FIG. 3, a first user 51 inputs a new value 53 as input value into the non-failsafe operator device 50. This new value, together with an identifier, is transmitted as data 56 to the failsafe F function 64. The F function 64 either returns the new value to the operator device 50 as a readback value 57 or reports a status value 58, e.g. an error. The first user 51 can then accept the readback value by a repeat input 54 of the new value as an acceptance. The operator device transmits the acceptance 59 to the F function 64. Optionally, especially to enhance safety, a second user 52 can accept the value by supplying an acceptance 55 to the operator device 50. If the user 51 or 52 chooses to abort or wishes the F function 64 to be reset, an abort signal or reset signal 60 is sent to the failsafe F function 64. In addition to the values of the operator device 50 that are read in via non-failsafe interfaces, there are provided further failsafe parameters 65-71 as input values for the F function. A first parameter 65 pre-selects the maximum permissible change in a new value by comparison with the existing F value. One or more further parameters 66 pre-select absolute limit values for the relevant plant. Identifiers are stored as parameters 67. A readback value is simulated in the parameter 68 for a test of the operator device 50. The F function 64 can be activated or deactivated by setting or not setting the parameter 69. The parameter or parameters 70 indicate the limits of the time slot for the programmable monitoring means that monitors time. The parameter 71 determines different operating modes for the F function 64. The value inputted and accepted as safe is accepted as what is called a "safe F value" 62 on a safe route 63 and is also transmitted to the operator device 50 as needed on a non-safe route 61. The failsafe F function 64 usually runs in the central processing unit (CPU) of an automation system, especially in a failsafe central processing unit (F CPU). The F function can be in the form of an F function block within an automation program.

Possible errors that have to be controlled are:
transmission errors
errors in input conversion
errors in output conversion
address corruption
systematic errors in the operator device
"short" from the input field to the readback field
data changes too early or too late
simultaneous access to the arithmetic unit by different operator devices.

An address corruption is detected since a val ID is co-transmitted for the F value and, at the same time, independently of this the val ID for the value is kept in a diversitary manner (i.e. in this case with the complement) in the F CPU. The F function compares the val ID. The val ID must be unique for the entire project.

It is essentially assumed that the users who input safety-related data are appropriately trained. This means that no completely arbitrary data can be input. It is usually assumed that a user who is asked to perform safety-related tasks and is therefore reliable will, on average, make no more than one mistake in a thousand operator inputs. Until now a use r has himself had to ensure, by virtue of appropriate failsafe programming, that all the above-mentioned errors that can occur in the operator device, in communication to the F function and in addressing to the F function are detected and controlled. If he was not in a position to do so, he had to change the parameter in the F program, re-compile the program, reload it into the F CPU and test the change.

Indicated below, for a further exemplary embodiment, is the operator sequence for (general) system-supported safe operation (F operation). At the operator interface of the operator device, for each operator-controllable safety-related value or parameter there is an input field a readback display field (number representation in a different character font)

a repeat input field (acceptance)

a display field for the display of the value currently used in the F program.

The user inputs the new value into the input field via the keyboard. The value, together with the "ID for this value" (=val ID), is transmitted decrypted by the operator device (also referred to below as OS=operator station) to the F function. On the F side, the interface is a standard (non-F) "new value" input point. The F function checks the input value and, after verification, applies the complement to the readback value. The OS converts the complement and displays the result on the "readback display field". The user compares the value in the input field with the readback value and, if the values are not the same, he must select the abort function. If, in his opinion, the values are identical, he accepts the input by inputting the value again (this repetition of the input can also be performed by another user). From this value the OS generates the complement and transmits it as acceptance to the F function. The F function compares "new value" and "acceptance" (i.e. value and complement) and, if these match, the F function releases the new value.

The value has to be inputted in a fixed input field (which is assigned to the F value and is thus internally provided with an F ID—on placement of the template/operating program). On input, each individual digit is compared with the required digit by the operator (safety requirement to check keyboard function). Operation of an enter key causes the value to be communicated, together with the val ID, by the OS to the F function "safe operator input" (any communication route within the plant). The F function reflects the "complement" of the value to the OS for checking. In the OS, the complement is calculated back to the value, and the value is displayed in the subjacent output field for checking purposes. The operator compares the value with the value first inputted. If the value is identical and the operator agrees, he types the value in again a second time as acceptance and presses the enter key. The OS transmits the value, together with the val ID, as complement to the F function. The F function checks the acceptance and, if the timing is correct and the data is correct, it accepts the value as a safe value. This value is again displayed by the OS and finally has to be checked again by the user. If the said value differs from the required value, the operator must respond by carrying out a new safety input or by stopping this function. This last check is, however, not necessary from a safety engineering perspective, i.e. to achieve safety level SIL 3.

For the function in the OS and for data transmission, probabilistic evidence in conformity with SIL 2 has to be produced (SIL=safety integrity level as defined in IEC 61508). Probabilistic evidence of this kind can, for example, involve carrying out an FMEA (failure mode and effect analysis). The safety requirement for the F function block is SIL 3. As the whole operating procedure is observed by the use r, the entire function achieves SIL 3. Responsibility for the input of the correct value at the correct point remains with the user. The OS, or rather the entire "safe input" function, is responsible only for the correct transmission of the value displayed. The val ID typically has values between 1 and FFFE (hexadecimal). If an error occurs while the method is being carried out, the last valid safe value is always maintained. After a restart the values have to be inputted again.

In a typical scenario where a development of the invention could be used, a production plant operates under precisely defined conditions. A current plant value is displayed on a display field of an OS. Temperature values or pressure values in the failsafe part of the plant have to be changed as a function of the products in production at the time. When the required change is carried out, however, the new values do not exceed or fall below the plant-specific limit values, which are not to be changed. The values to be changed are not necessarily only the values related to safety but also affect product quality. Further safety-related values to be changed could, however, also have repercussions for potential risks. In a first scenario, a user inputs a change request into the operating system. The safety function concerned in this scenario then switches to safe mode (which would generally not be necessary from a safety engineering perspective). The user inputs the new value into an input field provided for this purpose. The user validates his input with his own key (of a mechanical or more complex type, e.g. chip card, biometric key and the like), as a result of which a single bit value (validation user) is set. The value inputted is compared with the plant limit values. If the input is incorrect, a pre-programmed default value can be validated. The accepted value or the default value is displayed in a display field provided for this purpose. The "accepted" or "not accepted" status is displayed with its own single bit value (acceptation condition) in a separate display field.

In a second scenario, a second user, the supervisor, verifies and validates the input of the first user and the reflected value with his own key. Depending on his validation, a single bit value (validation supervisor) is generated and displayed. An accepted value is displayed as the currently valid value. If the supervisor does not accept the value inputted by the first user within a definable time span, the input function is reset.

After a stop and restart of the (F) CPU and/or after a power supply failure, the F function remains in safe mode and the respective default value is displayed as the currently valid safe value.

To summarize, the invention therefore relates to a system and also a method for reliably recording input values for processing in a failsafe arithmetic unit. To enable input values to be reliably recorded with a non-failsafe operator device, it is proposed that, by means of an operator device, a first value inputted via input means is displayed with first display means, the first value, together with an identification value, is transmitted decrypted to a failsafe arithmetic unit, a second value communicated by the arithmetic unit is converted into a third value, the third value is displayed with second display means, a fourth value inputted via the input means is displayed with third display means, the fourth value is converted into a fifth value and the fifth value, together with the identification value, is transmitted decrypted to the arithmetic unit, and that the arithmetic unit stores the first value and also control values and limit values, compares the identification value with one of the control values by means of first comparison means 11, compares the first value with the limit values by means of second comparison means 12, converts the first value into a second value, transmits the second value decrypted to the operator device, and compares the fifth value with the first value by means of third comparison means 13.

The invention claimed is:

1. A system for reliably acquiring input values, comprising:
an operator device; and
a failsafe arithmetic unit, wherein
the operator device comprises:
  a first display for displaying a first value input via an input device;
  a communication device for a unencrypted transmission of the first value together with an identification value, to the arithmetic unit;
  a first arithmetic processor for converting a second value into a third value, the second value communicated by the failsafe arithmetic unit to the operator device;
  a second display for displaying the third value; and
  a third display for displaying a fourth value input via the input device, the first arithmetic processor configured to convert the fourth value into a fifth value, the communication device configured for an unencrypted transmission of the fifth value together with the identification value, to the failsafe arithmetic unit, and
the failsafe arithmetic unit comprises:
  a memory for storing the first value and for storing control and limit values;
  a first comparator for the comparing the identification value to at least one of the stored control values;
  a second comparator for comparing the first value to the limit values;
  a second arithmetic processor for converting the first value into the second value;
  a transmission unit for an unencrypted transmission of the second value to the operator device; and
  a third comparator for comparing the fifth value to the first value.

2. The system according to claim 1, wherein the first or second arithmetic processors are configured to calculate a complement of the first, second, third, fourth or fifth value.

3. The system according to claim 1, wherein the failsafe arithmetic unit further comprises a release device for authorizing the first value based on comparison results processed by the first, second or third comparator.

4. The system according to claim 1, wherein the first and second display are configured to display the first value and third value in different formats.

5. The system according to claim 1, wherein the operator device further comprises an abort function configured to be activated via the input device.

6. The system according to claim 1, wherein the failsafe arithmetic unit further comprises a programmable monitoring unit for time-monitoring a transmission of the first and fourth values.

7. The system according to claim 1, wherein the operator device further comprises a fourth display for displaying a sixth value transmitted by the failsafe arithmetic unit.

8. The system according to claim 1, wherein the memory is configured for a diversitary storage of the control values.

9. The system according to claim 1, wherein the input device does not enable a drag & drop function.

10. The system according to claim 1, wherein the arithmetic unit further comprises a failsafe function for safely executing a function test of the operator device.

11. The system according to claim 1, wherein the operator device further comprises an authentication function means for authenticating users.

12. A method of reliably acquiring input values, comprising:
displaying by an operator device on a first display a first value input via an input device;
transmitting the first value together with an identification value, to a failsafe arithmetic unit by the operator device;
converting a second value communicated by the arithmetic unit into a third value, by the operator device;
displaying the third value on a second display of the operator device;
displaying on a third display of the operator device a fourth value input via the input device;
converting the fourth value into a fifth value by the operator device;
transmitting the fifth value together with the identification value to the arithmetic unit, by the operator device;
storing the first value and control and limit values, by the arithmetic unit;
comparing the identification value to at least one of the control values by a first comparator of the arithmetic unit;
comparing the first value to the limit values by a second comparator of the arithmetic unit;
converting the first value into a second value, by the arithmetic unit;
transmitting the second value without encryption to the operator device, by the arithmetic unit; and
comparing the fifth value to the first value by a third comparator of the arithmetic unit.

13. The method according to claim 12, wherein a complement of the first, second, third, fourth or fifth value is calculated when converting the first, second, third, fourth or fifth value.

14. The method according to claim 12, wherein the arithmetic unit authorizes the first value based on comparison results processed by the first, second or third comparator.

15. The method according to claim 12, wherein the first value and third value are displayed in different formats.

16. The method according to claim 12, wherein the operator device comprises an abort function configured to be activated via the input device.

17. The method according to claim 12, further comprising time-monitoring a transmission of the first and fourth values by a programmable monitoring unit of the arithmetic unit.

18. The method according to claim 12, wherein the input device does not enable a drag & drop function.

19. The method according to claim 12, further comprising executing a function test of the operator device by a failsafe function of the arithmetic unit.

20. The method according to claim 12, further comprising authenticating a user by the operator device.

* * * * *